(12) United States Patent
Kim et al.

(10) Patent No.: US 7,713,611 B2
(45) Date of Patent: May 11, 2010

(54) FILTER AND DISPLAY APPARATUS HAVING THE SAME

(75) Inventors: Ji-Suk Kim, Suwon-si (KR);
Sung-Yong Lee, Suwon-si (KR);
Cha-Won Hwang, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 11/727,476

(22) Filed: Mar. 27, 2007

(65) Prior Publication Data

US 2007/0228914 A1 Oct. 4, 2007

(30) Foreign Application Priority Data

Mar. 28, 2006 (KR) .................... 10-2006-0028118

(51) Int. Cl.
*B32B 3/00* (2006.01)

(52) U.S. Cl. ................. 428/212; 428/156; 428/220; 313/111; 313/112; 313/113

(58) Field of Classification Search ............. 428/156, 428/212, 220; 313/111, 112, 113
See application file for complete search history.

(56) References Cited

U.S. PATENT DOCUMENTS

| | | | | |
|---|---|---|---|---|
| 5,461,397 A | * | 10/1995 | Zhang et al. | 345/102 |
| 5,982,095 A | * | 11/1999 | Jin et al. | 313/582 |
| 7,253,955 B2 | * | 8/2007 | Watanabe et al. | 359/459 |

FOREIGN PATENT DOCUMENTS

WO WO2005103769 * 3/2005

* cited by examiner

*Primary Examiner*—David R Sample
*Assistant Examiner*—Lawrence D Ferguson
(74) *Attorney, Agent, or Firm*—Lee & Morse, P.C.

(57) ABSTRACT

A display apparatus includes a display and a display filter, wherein the display filter includes a base film, a plurality of reflective elements, and a plurality of light absorbing elements, wherein each of the light absorbing elements corresponds to a reflective element.

20 Claims, 3 Drawing Sheets

FILTER AND DISPLAY APPARATUS HAVING THE SAME

CROSS-REFERENCE TO RELATED APPLICATION

This application is related to co-pending U.S. patent application Ser. No. 11/727,477, entitled "FILTER AND DISPLAY APPARATUS HAVING THE SAME," which was filed on Mar. 27, 2007.

BACKGROUND OF THE INVENTION

1. Field of the Invention

Embodiments of the present invention relate to a filter and a display apparatus having the filter. More particularly, embodiments of the present invention relate to a filter that may increase bright room contrast by increasing transmittance of light emitted from inside the display apparatus and blocking light incident from outside the display apparatus, and a display apparatus having the filter.

2. Description of the Related Art

A display apparatus may include a filter in order to effect changes in various display characteristics, such as reducing reflections, etc., and to protect the display against damage. However, such a display apparatus may exhibit double reflections due to refraction caused by a material difference between a front of the display and the filter. Also, a tempered glass filter may be used to protect the display apparatus, but such a filter may need to have a thickness of 3 mm or more to resist external impact, which increases the weight and cost of the display apparatus. Furthermore, a tempered glass filter may have a complicated structure including various filters having various functions. Therefore, the process of manufacturing the tempered glass filter may be complicated and costly.

SUMMARY OF THE INVENTION

The present invention is therefore directed to a filter and a display apparatus having the same, which substantially overcome one or more of the problems due to the limitations and disadvantages of the related art.

It is therefore a feature of an embodiment of the present invention to provide a filter, and a display apparatus having the same, that includes a plurality of reflective elements and a corresponding plurality of light absorbing elements, which may significantly increase bright room contrast without a significant reduction in the amount of visible light emitted by the display apparatus and which may be lightweight.

It is therefore another feature of an embodiment of the present invention to provide a filter that may be directly attached to a display.

At least one of the above and other features and advantages of the present invention may be realized by providing a display apparatus, including a display and a display filter, wherein the display filter includes a base film, a plurality of reflective elements, and a plurality of light absorbing elements, wherein each of the light absorbing elements corresponds to a reflective element.

The display may include a plurality of pixels having a predetermined size, each light absorbing element may be paired with a reflective element, and a width of the pair may correspond to the predetermined size. Adjacent pairs may be separated by a gap and a size of the gap may correspond to the predetermined size. The display may include a plasma display panel having a plurality of discharge cells, and a size of the discharge cells may be equal to the predetermined size. The display filter may be directly attached to the display.

At least one of the above and other features and advantages of the present invention may also be realized by providing a display filter, including a base film, a plurality of reflective elements, and a plurality of light absorbing elements, wherein each of the light absorbing elements corresponds to a reflective element.

The light absorbing elements may be black units. Each light absorbing element may be paired with a reflective element such that the light absorbing element and the reflective element are stacked. The stack may have a width of about 10 μm to about 100 μm. The stack may have a height of about 50 μm to about 500 μm. Adjacent stacks may be separated by a gap of about 50 μm to about 1000 μm.

The reflective elements may have triangular or trapezoidal cross-sections. The light absorbing elements have triangular or trapezoidal cross-sections. The light absorbing elements may have a side disposed at a predetermined angle with respect to a major surface of the base film, the angle being greater than or equal to about 45 degrees. Each light absorbing element may be paired with a reflective element such that the light absorbing element and the reflective element form a diamond. At least one of the reflective elements and the light absorbing elements may have a trapezoidal cross-section, the trapezoidal cross-section may have a narrower side and a wider side, and a ratio of a width of the narrower side to a width of the wider side may be less than or equal to about 0.9.

The reflective elements may be a metal containing at least one of Ag, Cu, Ni, and Cr. The light absorbing elements may be a ceramic material. The light absorbing elements may have a low brightness and chroma. The base film may include a laminate of a first film and a second film, the plurality of reflective elements may be disposed in the first film, and the plurality of light absorbing elements may be disposed in the second film.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1A:
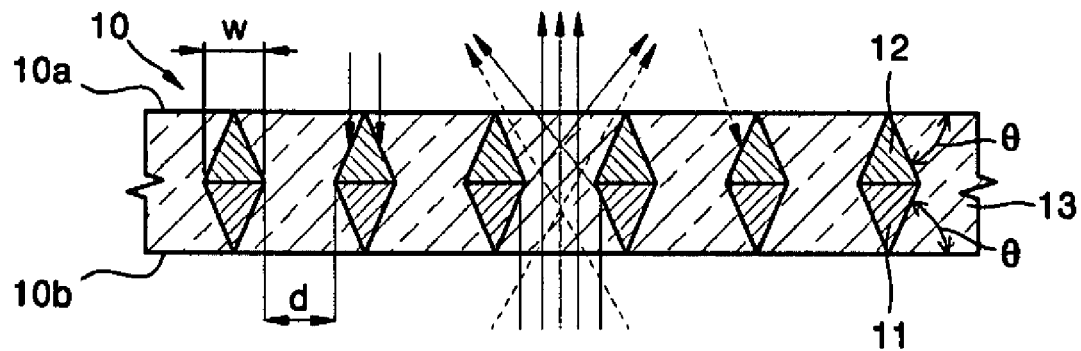
FIG. 1A illustrates a cross-sectional view of a filter according to an embodiment of the present invention.

Korean Patent Application No. 10-2006-0028118, filed on Mar. 28, 2006, in the Korean Intellectual Property Office, and entitled: "CEF Filter and Plasma Display Apparatus Having the Same," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1A illustrates a cross-sectional view of a filter 10 according to an embodiment of the present invention. Referring to FIG. 1A, the filter 10 may include a plurality of reflective elements 11 and corresponding light absorbing elements 12, and a base film 13.

As indicated by the arrows in FIG. 1A, the filter 10 may partly block, partly transmit, and partly diffuse visible light incident from the rear side 10b, or display side, of the filter 10. Also, visible light incident from the front of the filter 10 may be partly blocked, partly transmitted, and partly diffused. In FIG. 1A, dotted arrows indicate light incident on the filter 10 at an angle, such as diffused light, and solid arrows indicate light incident on the filter 10 normal to the major plane of the filter 10. The filter 10 according to an embodiment of the present invention may significantly increase bright room contrast without a significant reduction in the amount of visible light emitted by the display apparatus.

As indicated by the arrows in FIG. 1A, the filter 10 may transmit a portion of visible light incident from the rear side 10b of the filter 10 straight towards the front side 10a. Another portion of the light incident from the rear side 10b may be transmitted toward the front side 10a by reflecting the light from the reflective element 11. An angle θ formed by the reflective element 11 and the front side 10a of the filter 10 may be about 60 degrees or more in order to efficiently pass light out the front side 10a of the filter 10. Thus, a portion of visible light generated by the operation of the display passes directly through the filter 10 towards the front side 10a, and another portion of the light progresses towards the front side 10a by being reflected at the reflective element 11. Accordingly, the transmittance of internal light may be increased without significant reductions in brightness.

Visible light incident on the display apparatus from the front side 10a, i.e., external light, may be absorbed or scattered by the light absorbing element 12, not reflected. The scattered visible light may be reflected toward the front side 10a by a reflection structure additionally formed on a side of the display, thereby preventing a reduction of brightness. In this way, the filter 10 according to an embodiment of the present invention may significantly increase bright room contrast without a significant reduction in the amount of visible light emitted by the display. Also, external light may be blocked and absorbed by the light absorbing element 12, thereby increasing bright room contrast.

A display apparatus having the filter 10 may exhibit enhanced bright room contrast. In an implementation, the filter 10 may be a contrast enhancing filter (CEF). The filter 10 may be implemented as a directly attached filter, which is directly attached to the display.

The reflective element 11 may reflect visible light incident thereon that originates from the rear side 10b, i.e., the display side, of the filter 10. The reflected visible light may be diffused and a portion of the visible light may be passed forward. The reflective element 11 may be formed of any of a variety of suitable materials that can reflect visible light, e.g., a metal such as Ag, Cu, Ni, Cr, etc. The reflective element 11 may have a shape and orientation that enables reflection of light from the rear side 10b of the filter, e.g., an inverted trapezoid, an inverted triangle, etc., as depicted in FIG. 1A. In such an implementation, the reflective element 11 may be arranged with its wider face oriented to the front side 10a of the filter 10, and with its narrower face oriented to the rear side 10b of the filter 10.

The light absorbing element 12 may be disposed in front of the reflective element 11. The light absorbing element 12 may be formed of a material having a high absorption of visible light, and may have a color having a low brightness and chroma, e.g., brown, aquamarine, or achromatic colors. In an implementation, the light absorbing element may be black.

The base film 13 may include a plurality of the reflective elements 11 and the light absorbing elements 12. The plurality of elements may be disposed on the base film 13, and may be distributed maintaining a substantially uniform gap d therebetween. In an implementation, the light absorbing element 12 may have, e.g., a triangular or trapezoidal cross-section as depicted in FIG. 1A, which may be arranged with its narrower face to the front.

As depicted in FIG. 1A, the reflective element 11 and the light absorbing element 12 may contact each other. That is, the reflective element 11 and the light absorbing element 12 may form substantially a diamond shape. The paired reflective element 11 and light absorbing element 12 may have a predetermined width w and may be separated from an adjacent pair by the gap d. The width w and the gap d may be adapted to maximize the bright room contrast by blocking, transmitting, and diffusing light. Where the filter 10 is to be used in conjunction with a display that has a plurality of pixels, the width w and the gap d may be determined based on a size of the pixels. For example, the filter 10 may be implemented as a filter for a plasma display panel. In such a case, the width w and the gap d may be determined based on a width of discharge cells in the plasma display panel, which may be, e.g., about 100 µm to about 200 µm. The upper limit of the size of the gap d may be limited by the width of the discharge cell of the plasma display panel. The gap d may be equal to or greater than the width w.

In an implementation, the paired reflective element 11 and light absorbing element 12 may have a width w of about 10 µm to about 100 µm and may have a height of about 50 µm to about 500 µm, and the gap d may be about 50 µm or more. Where the filter 10 is implemented as a filter for a plasma display panel, the gap d may be 1 mm or less, which may be a little more than the maximum width of a typical plasma discharge cell.

If the cross-sectional shapes of the reflective element 11 and the light absorbing element 12 are trapezoidal (not shown), the wider side of the trapezoid may have a width of about 10 µm to 100 µm. The narrower side of the trapezoid may have a width ratio of about 0.9 or less of the width of the wider side, i.e., $\text{width}_{narrower}/\text{width}_{wider} \leq$ about 0.9.

The base film 13 may be formed of a material that transmits visible light. The base film 13 may be adapted so that the filter 10 can be directly attached to a front surface of the display. The base film 13 may be, e.g., a transparent material that allows the filter 10 to be attached to glass or plastic. The base film 13 may be formed of a flexible material, which may allow for convenient transporting and attaching to the display.

Various materials, or combinations thereof, may be employed for the base film 13. For example, the base film 13 may be formed of polyethersulphone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), etc. PC, PET, TAC, and PEN may be particularly suitable for the base film 13.

The base film 13 may be colored to control the transmittance of visible light of the whole filter 10. For example, the transmittance of visible light may be reduced by providing the base film 13 with a dark color, the whole base film 13 may be colored to give a pleasant appearance to the user, or it may be colored to increase the chroma of the display apparatus. The color of the base film 13 may be patterned to correspond to pixels of the display. In an implementation, the color of the base film 13 may be patterned to correspond to subpixels of a plasma display panel. It will be appreciated that the base film 13 may be colored in various ways for a variety of color correction purposes.

The base film 13 may have a flat, substantially planar shape, and may have a thickness of about 50 μm to about 500 μm. If the base film 13 is too thin, it may not be effective to prevent the scattering of glass fragments if the display apparatus is damaged by an impact. However, if the thickness of the base film 13 is unduly increased, the efficiency of a laminating process may be reduced. In an implementation, the base film 13 may have a thickness of about 80 μm to about 400 μm.

Figure 1B:
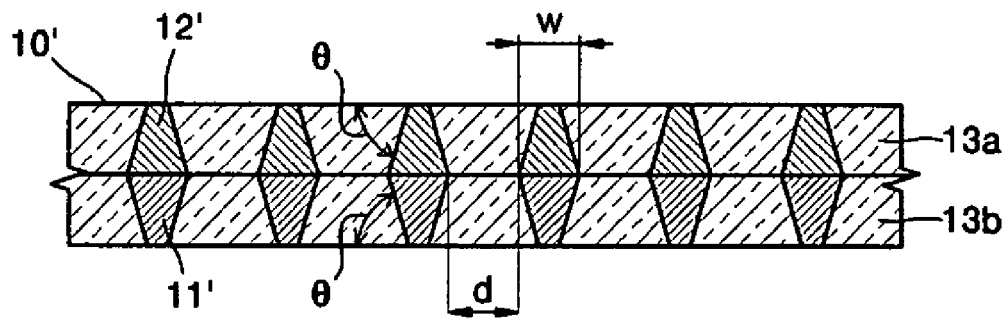
FIG. 1B illustrates a cross-sectional view of a filter according to another embodiment of the present invention.

Referring to FIG. 1B, a filter 10' according to another embodiment of the present invention may be made by forming one base film layer 13a that includes light absorbing elements, e.g., triangular light absorbing elements (not shown) or trapezoidal light absorbing elements 12', and forming another base film layer 13b that includes reflective elements, e.g., triangular reflective elements (not shown) or trapezoidal reflective elements 11', e.g., by a transferring method, and then joining together the two base film layers 13a, 13b as a laminate.

Figure 2:
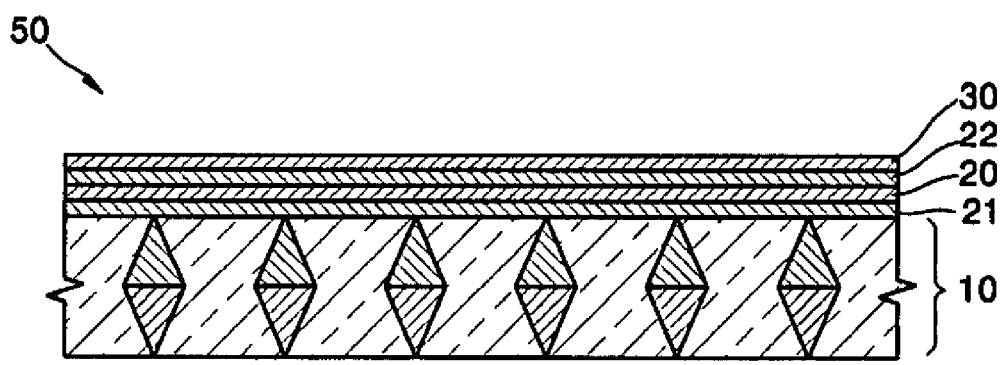
FIG. 2 illustrates a cross-sectional view of a filter according to another embodiment of the present invention.

FIG. 2 illustrates a cross-sectional view of a filter 50 according to another embodiment of the present invention. Referring to FIG. 2, the filter 50 may include the filter 10 described above, as well as one or more additional layers such as an electromagnetic wave shielding layer 20, a film layer 21, an adhesive layer 22, and/or a reflection prevention layer 30.

The electromagnetic wave shielding layer 20 and the reflection prevention layer 30 may be attached to the front of the light absorbing element 12 as depicted in FIG. 2, or to the rear of the light absorbing element 12 (not shown). The electromagnetic wave shielding layer 20 may block electromagnetic waves. Such waves may be generated by the display apparatus, e.g., where the display apparatus includes a plasma display panel. Blocking such waves may prevent unwanted interference, and may reduce the possibility of exposing a person adjacent to the display to harmful waves. A metal layer and/or the metal oxide layer in the electromagnetic wave shielding layer 20 may block near infrared light as well as electromagnetic waves. Accordingly, malfunction of peripheral electronic devices, such as those employing infrared light-based remote controls, due to the near infrared light may be reduced.

The electromagnetic wave shielding layer 20 may be adapted to a variety of suitable shapes and forms and may be implemented as, e.g., a mesh of conductive metal. In an implementation, the electromagnetic wave shielding layer 20 may be formed by stacking a plurality of metal layers and/or metal oxide layers, e.g., in a multilayer structure of five to eleven layers. In particular, if metal oxide layers and metal layers are stacked together, the metal oxide layers may reduce or prevent degradation of the metal layers. Also, if the electromagnetic wave shielding layer 20 is formed by stacking multiple layers, the surface resistance value of the electromagnetic wave shielding layer 20 may be corrected, and this may also allow for controlling the transmittance of visible light.

The metal layer may be formed of, e.g., palladium, copper, platinum, rhodium, aluminum, iron, cobalt, nickel, zinc, ruthenium, tin, tungsten, iridium, lead, silver, a composite of these metals, etc. The metal oxide layer may be formed of tin oxide, indium oxide, antimony oxide, zinc oxide, zirconium oxide, titanium oxide, magnesium oxide, silicon oxide, aluminum oxide, a metal alkoxide, indium tin oxide (ITO), antimony tin oxide (ATO), etc.

The electromagnetic wave shielding layer 20 may be formed by suitable processes such as sputtering, vacuum evaporation, ion plating, chemical vapor deposition (CVD), plasma vapor deposition (PVD), etc. The electromagnetic wave shielding layer 20 may be formed after the film layer 21 is formed on the front surface of the filter 10, i.e., the film layer 21 may be interposed between the electromagnetic wave shielding layer 20 and the filter 10.

The reflection prevention layer 30 may serve to diffuse external incident light at the surface of the filter 50, i.e., light impinging on the filter 50 from outside the display apparatus. Thus, the reflection prevention layer 30 may reduce or prevent the reflection of the peripheral environment from the surface of the filter 50.

The filter 50 may be directly attached to a front surface of a display, and thus the reflection prevention layer 30 may be combined with the filter 50. In contrast, if a reflection prevention layer were to be combined with a conventional tempered glass filter, image clarity could be reduced due to an interface between the front of the display and the tempered glass filter. Thus, it may not be desirable to combine a reflection prevention layer with a conventional tempered glass filter. However, the filter 50 according to this embodiment of the present invention may not exhibit such a reduction in image clarity because the filter 50 may be directly attached to the front surface of a display, e.g., attached to a front surface of a plasma display panel.

The filter 50 may further include a hard coating material (not shown) inside the reflection prevention layer 30. Such a hard coating material may help reduce the occurrence of scratches. That is, scratches on the filter 50 caused by external forces may be reduced or prevented by the hard coating material in the reflection prevention layer 30. The hard coating material may be coated inside the reflection prevention layer 30. An additional hard coating layer (not shown) may also be formed on the reflection prevention layer 30.

The hard coating material may include a polymer as a binder, e.g., an acryl polymer, a urethane polymer, an epoxy polymer, a siloxane polymer, an ultraviolet hardening resin such as oligomer, etc. To increase hardness, a silica group filler may be included in the hard coating material.

In an implementation, the reflection prevention layer 30 may have a thickness of about 2 μm to about 7 μm, a pencil hardness of about 2H to about 3H, and a haze of about 1% to about 3%.

The adhesive layer 22 may be disposed between the electromagnetic wave shielding layer 20 and the reflection prevention layer 30. The adhesive layer 22 may provide an adhesive force between the electromagnetic wave shielding layer 20 and the reflection prevention layer 30. An adhesive layer may also be formed on the lower surface of the filter 10 (not shown) to provide adhesion between the filter 10 and a front surface of the display. To reduce a double image phenomenon, the adhesive layer 22 may have a predetermined refractive index difference with respect to the display. In an implementation, the difference in refractive indices may be less than or equal to about 1%.

The adhesive layer 22 may include, e.g., a thermoplastic UV hardening resin such as an acrylate resin, a pressure sensitive adhesive (PSA), etc. The adhesive layer 22 may be formed by suitable processes such as dip coating, air knife coating, roller coating, wire bar coating, gravure coating, etc.

The adhesive layer 22 may include a compound that absorbs near infrared light. The compound may be, e.g., a resin that includes copper atoms, a resin that includes a copper compound or a phosphorus compound, a resin that includes a copper compound or a thio urea derivative, a resin that includes a tungsten compound, a cyanine compound, etc.

In an implementation, the adhesive layer 22 may further include a dye or a pigment to provide color correction by blocking light commonly referred to as "neon glow." The dye or pigment may selectively absorb light in the visible region, which is generally considered to be in the 380 nm to 760 nm range or 400 nm to 700 nm range. For example, the dye or pigment may be employed when the filter 50 is to be combined with a plasma display panel. When discharge occurs in a plasma display panel, undesirable visible light having a wavelength of approximately 585 nm may be generated by plasma discharge gas. To absorb this light, a pigment of cyanine, squaryl, azomethine, xanthine, oxonol, and/or azo group compounds may be used. The pigment compound may be dispersed in a fine grain state throughout the adhesive layer 22.

In other implementations (not shown), the filter 50 may optionally include a near infrared light shielding layer and/or a color correction layer. Near infrared light may be blocked by the electromagnetic wave shielding layer 20 and/or the adhesive layer 22, and if necessary, the blocking of near infrared light can be increased by adding an additional layer. The color correction layer may be used when the chroma of light generated by the display to which the filter 50 is applied is low, or if corrections to the color temperature are desired.

In an implementation, the filter 50 having the above structure may have a light transmittance of about 30% to about 80% and a haze of about 1% to about 10%.

Figure 3:
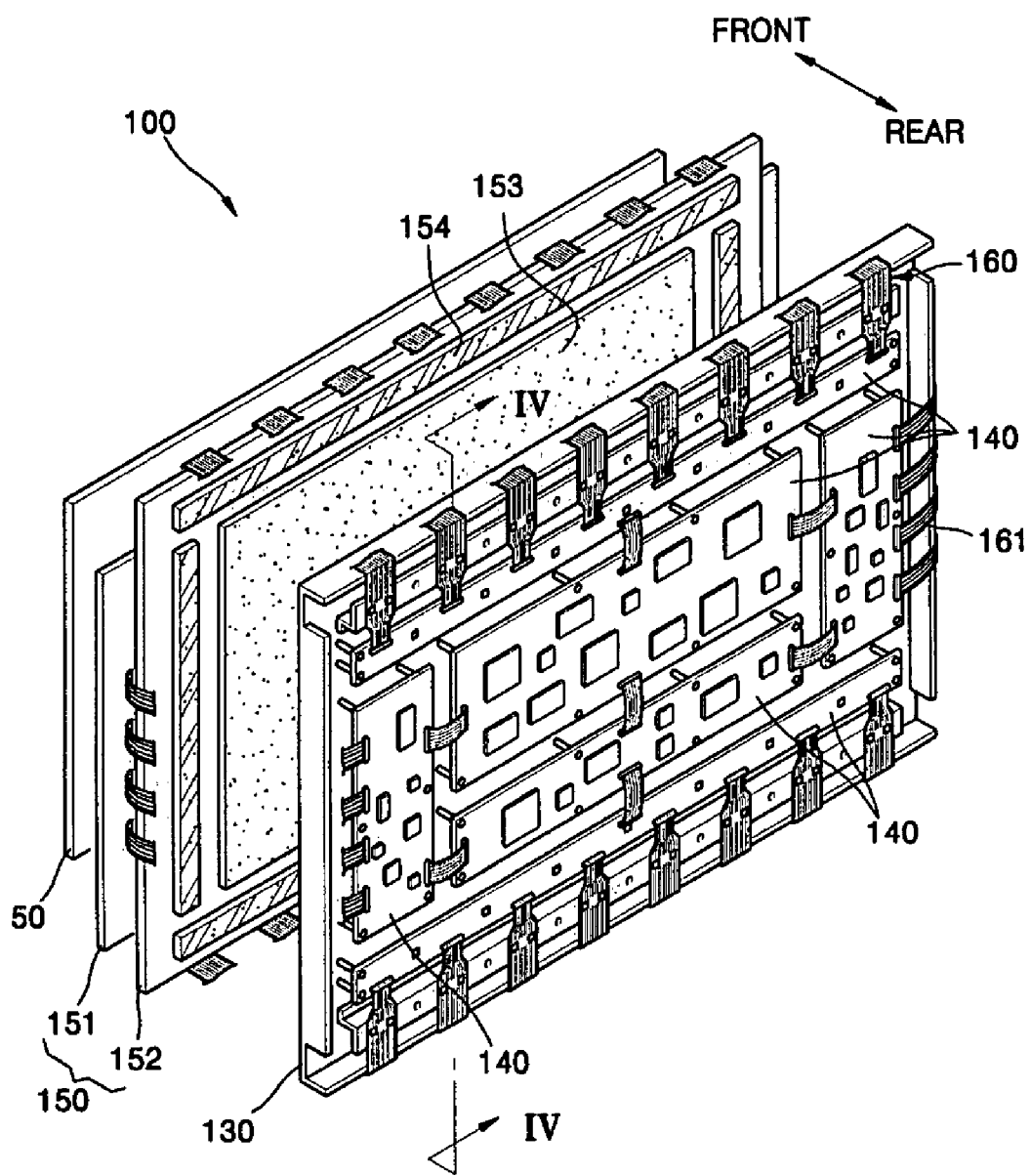
FIG. 3 illustrates an exploded perspective view of a display apparatus having a filter according to an embodiment of the present invention.
Figure 4:
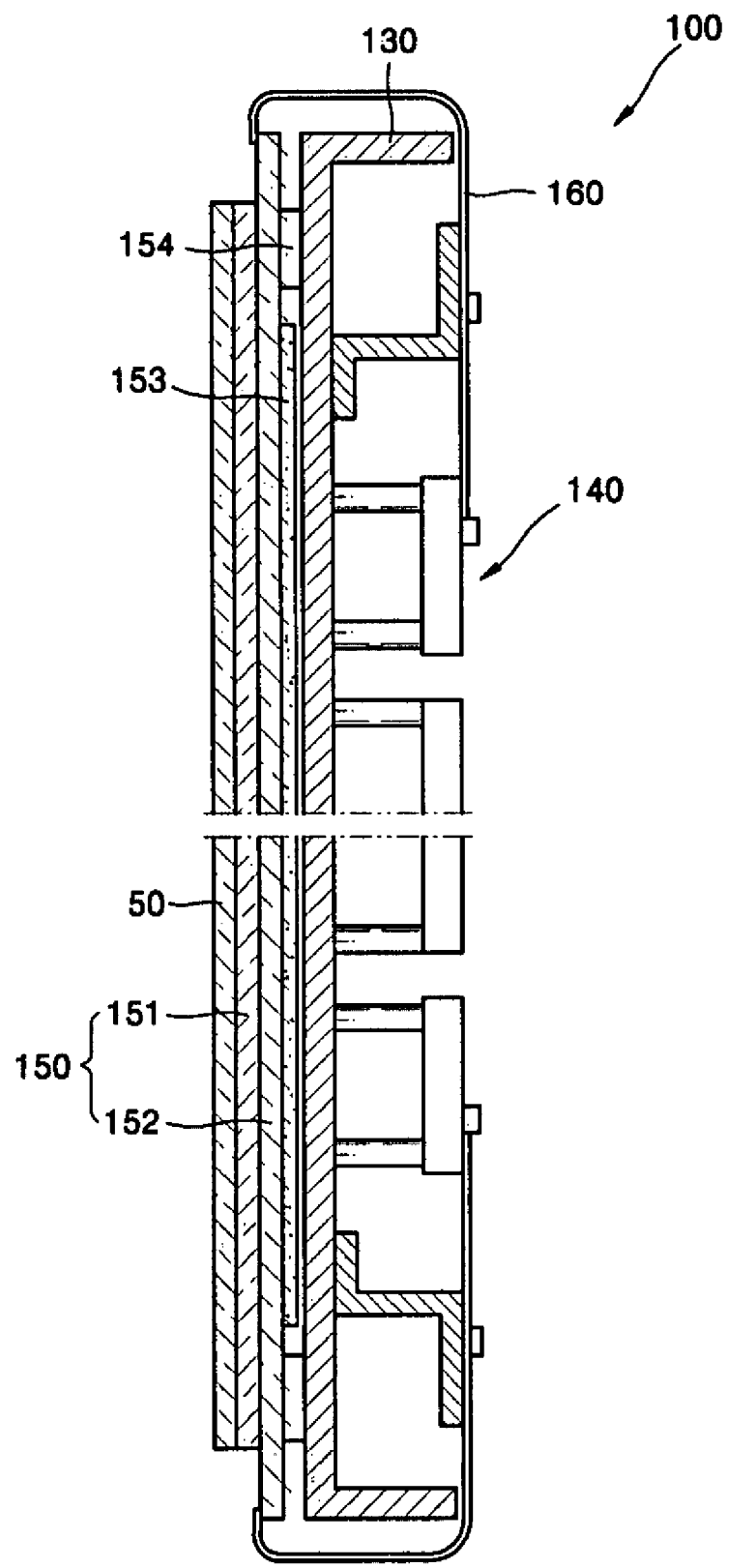
FIG. 4 illustrates a cross-sectional view taken along a line IV-IV of FIG. 3.

FIG. 3 illustrates an exploded perspective view of a display apparatus 100 having a filter 50 according to an embodiment of the present invention, and FIG. 4 illustrates a cross-sectional view taken along a line IV-IV of FIG. 3. Referring to FIGS. 3 and 4, the display apparatus 100 may include a display panel 150, a chassis 130, and a circuit unit 140. The display panel 150 may include a front panel 151 and a rear panel 152 coupled to each other. The display panel 150 may be, e.g., a plasma display panel. A filter 50 according to an embodiment of the present invention may be attached to the front surface of the display panel 150, e.g., by an adhesive layer (not shown). The filter 50 may be implemented as a directly attached filter.

An adhesive element 154, e.g., double-sided tape, may couple the display panel 150 to the chassis 130. A thermal conduction member 153 may be located between the chassis 130 and the display panel 150, in order to dissipate heat generated by the display panel 150 by conducting the heat to the chassis 130.

The filter 50 may block electromagnetic waves generated by the display panel 150 and may reduce glare. Also, infrared light or neon glow may be blocked by the filter 50. Furthermore, the filter 50 may be substantially directly attached to the front surface of the display panel 150, which may reduce or eliminate a double image. Also, the filter 50 may have a lower weight and/or lower cost than a conventional tempered glass filter.

The chassis 130 may be disposed to the rear of the display panel 150 and may structurally support the display panel 150. The chassis 130 may be formed of a metal having high strength, e.g., aluminum or iron, or of plastic.

The thermal conduction member 153 may be disposed between the display panel 150 and the chassis 130. A plurality of adhesive elements 154 may be provided on the rear panel 152 along the edges of the thermal conduction member 153.

The circuit unit 140 may be located on the rear of the chassis 130. The circuit unit 140 may include circuits that drive the display panel 150. The circuit unit 140 may transmit electrical signals to the display panel 150 via signal transmitting elements 160, 161. The signal transmitting elements may be, e.g., a flexible printed cable, a tape carrier package, a chip on film, etc.

Although this description refers to the filter 50 of FIG. 2, it will be appreciated that embodiments of the present invention are not limited thereto. For example, the display apparatus 100 may simply use the filter 10 illustrated FIG. 1A. Further, it will be appreciated that the filters 10, 50 may be various shapes and/or sizes. Additionally, a filter according to an embodiment of the present invention may be used for various display apparatuses including, but not limited to, a plasma display apparatus.

A filter according to an embodiment of the present invention and a display apparatus having the filter may reduce a double image phenomenon, since the filter may be directly attached to the front surface of the display. Also, the filter may have a relatively thin base film and, accordingly, may have a low weight and good light transmittance.

A plurality of reflective elements and corresponding light absorbing elements may be distributed throughout the filter. Therefore, display brightness may be significantly enhanced by diffusing internal light, and reflection of external light may be significantly decreased, thereby enhancing bright room contrast. Also design of the filter may enable a simple and inexpensive manufacturing process to be used therefor.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display apparatus, comprising:
   a display including pixels having a pixel width; and
   a display filter, wherein the display filter includes:
      a base film;
      a plurality of reflective elements, each reflective element having a wide face and a narrow face; and
      a plurality of light absorbing elements, each light absorbing element having a wide face and a narrow face, wherein:
      each of the light absorbing elements corresponds to a reflective element and the narrow face of each light absorbing element has a different orientation than the narrow face of the corresponding reflective element, and a width of the wide face of each reflective element and a width of the wide face of each light absorbing element being determined based on the pixel width.

2. The display apparatus as claimed in claim 1, wherein the display filter is directly attached to the display.

3. The display apparatus as claimed in claim 1, wherein the narrow face of each light absorbing element is oriented towards a first surface of the filter and the narrow face of the corresponding reflective element is oriented towards a second face of the filter, the second surface being opposite the first surface.

4. The filter as claimed in claim 3, wherein each pair forms a diamond shape.

5. A display apparatus, comprising:
a display including pixels having a pixel width; and
a display filter, wherein the display filter includes:
   a base film;
   a plurality of reflective elements, each reflective element having a wide face and a narrow face; and
   a plurality of light absorbing elements, each light absorbing element having a wide face and a narrow face, wherein:
   each of the light absorbing elements corresponds to a reflective element and the narrow face of each light absorbing element has a different orientation than the narrow face of the corresponding reflective element,
   the wide face of a light absorbing element abuts the wide face of the corresponding reflective element, forming a pair, and
   adjacent pairs are separated by a gap determined based on the pixel width.

6. The display apparatus as claimed in claim 5, wherein the display includes a plasma display panel having discharge cells of a discharge cell width,
a width of the pair determined based on the discharge cell width.

7. A display apparatus, comprising:
a display; and
a display filter, wherein the display filter includes:
   a base film;
   a plurality of reflective elements, each reflective element having a wide face and a narrow face; and
   a plurality of light absorbing elements, each light absorbing element having a wide face and a narrow face, wherein:
   each of the light absorbing elements corresponds to a reflective element and the narrow face of each light absorbing element has a different orientation than the narrow face of the corresponding reflective element,
   the wide face of a light absorbing element abuts the wide face of the corresponding reflective element, forming a pair, and
   widths of the wide face of the reflective element and of the wide face of the corresponding light absorbing element forming the pair are substantially equal.

8. A display filter, comprising:
a base film;
a plurality of reflective elements, each reflective element having a wide face and a narrow face; and
a plurality of light absorbing elements, each light absorbing element having a wide face and a narrow face, wherein:
each of the light absorbing elements corresponds to a reflective element and the narrow face of each light absorbing element has a different orientation than the narrow face of the corresponding reflective element,
each light absorbing element is stacked with a reflective element, forming a pair,
the wide face of a light absorbing element abuts the wide face of a corresponding reflective element, forming the pair, and
widths of the wide face of the a light absorbing element and of the wide face of the corresponding reflective element forming the pair are substantially equal.

9. The filter as claimed in claim 8, wherein the light absorbing elements are black units.

10. The filter as claimed in claim 8, wherein the pair has a width of about 10 µm to about 100 µm.

11. The filter as claimed in claim 8, wherein the pair has a height of about 50 µm to about 500 µm.

12. The filter as claimed in claim 8, wherein adjacent pairs are separated by a gap of about 50 µm to about 1000 µm.

13. The filter as claimed in claim 8, wherein the reflective elements have triangular or trapezoidal cross-sections.

14. The filter as claimed in claim 13, wherein the light absorbing elements have triangular or trapezoidal cross-sections.

15. The filter as claimed in claim 14, wherein the light absorbing elements have a side disposed at a predetermined angle with respect to a major surface of the base film, the angle being greater than or equal to about 45 degrees.

16. The filter as claimed in claim 8, wherein the reflective elements are a metal containing at least one of Ag, Cu, Ni, and Cr.

17. The filter as claimed in claim 8, wherein the light absorbing elements are a ceramic material.

18. The filter as claimed in claim 8, wherein the light absorbing elements have a low brightness and chroma.

19. The filter as claimed in claim 8, wherein the base film includes a laminate of a first film and a second film,
the plurality of reflective elements is disposed in the first film, and
the plurality of light absorbing elements is disposed in the second film.

20. The filter as claimed in claim 8, wherein the narrow face of each light absorbing element is oriented towards a first surface of the filter and the narrow face of each reflective element is oriented towards a second surface of the filter, the second surface being opposite the first surface.

* * * * *